US009209917B2

(12) United States Patent
Donald et al.

(10) Patent No.: US 9,209,917 B2
(45) Date of Patent: Dec. 8, 2015

(54) METHODS AND APPARATUS FOR METERING COMPUTER-BASED MEDIA PRESENTATION

(75) Inventors: James Lawrence Donald, Green Cove Spring, FL (US); David Howell Wright, Safety Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 988 days.

(21) Appl. No.: 12/055,769

(22) Filed: Mar. 26, 2008

(65) Prior Publication Data

US 2008/0172681 A1 Jul. 17, 2008

Related U.S. Application Data

(63) Continuation of application No. PCT/US2006/037395, filed on Sep. 26, 2006.

(60) Provisional application No. 60/720,391, filed on Sep. 26, 2005.

(51) Int. Cl.
*H04H 60/33* (2008.01)
*G06F 9/54* (2006.01)
*H04H 60/40* (2008.01)
*H04H 60/45* (2008.01)

(52) U.S. Cl.
CPC .............. *H04H 60/33* (2013.01); *G06F 9/54* (2013.01); *G06F 2209/542* (2013.01); *H04H 60/40* (2013.01); *H04H 60/45* (2013.01)

(58) Field of Classification Search
CPC ............................ G06F 2209/542; H04H 60/33

USPC ............................................................ 725/14
See application file for complete search history.

(56) References Cited

U.S. PATENT DOCUMENTS

| 3,484,787 A | 12/1969 | Vallese |
| 3,540,003 A | 11/1970 | Murphy |
| 3,818,458 A | 6/1974 | Deese |
| 3,906,450 A | 9/1975 | Prado, Jr. |
| 3,906,454 A | 9/1975 | Martin |

(Continued)

FOREIGN PATENT DOCUMENTS

| CA | 1318967 | 6/1993 |
| CA | 2353303 | 1/2003 |

(Continued)

OTHER PUBLICATIONS

Finnegan, J., "Hook and Monitor Any 16-bit Windows Function With Our ProcHook DLL", (Jan. 1994), Microsoft Systems Journal, vol. 9, No. 1, pp. 45-74.*

(Continued)

*Primary Examiner* — Brian W Wathen
(74) *Attorney, Agent, or Firm* — Hanley, Flight & Zimmerman, LLC

(57) ABSTRACT

Methods and apparatus for metering the presentation of computer-based media presentation are disclosed. An example disclosed method performed by a computer that is configured to execute an operating system and a media presentation program comprises modifying the media presentation program to re-direct a function call made to the operating system by the media presentation program, and processing the re-directed function call to determine media presentation information.

35 Claims, 4 Drawing Sheets

(56) References Cited

U.S. PATENT DOCUMENTS

| | | |
|---|---|---|
| T955,010 I4 | 2/1977 | Ragonese et al. |
| 4,168,396 A | 9/1979 | Best |
| 4,230,990 A | 10/1980 | Lert et al. |
| 4,232,193 A | 11/1980 | Gerard |
| 4,306,289 A | 12/1981 | Lumley |
| 4,319,079 A | 3/1982 | Best |
| 4,361,832 A | 11/1982 | Cole |
| 4,367,525 A | 1/1983 | Brown et al. |
| 4,558,413 A | 12/1985 | Schmidt et al. |
| 4,588,991 A | 5/1986 | Atalla |
| 4,590,550 A | 5/1986 | Eilert et al. |
| 4,595,950 A | 6/1986 | Lofberg |
| 4,621,325 A | 11/1986 | Naftzger et al. |
| 4,630,196 A | 12/1986 | Bednar et al. |
| 4,658,093 A | 4/1987 | Hellman |
| 4,672,572 A | 6/1987 | Alsberg |
| 4,685,056 A | 8/1987 | Barnsdale, Jr. et al. |
| 4,696,034 A | 9/1987 | Wiedemer |
| 4,703,324 A | 10/1987 | White |
| 4,712,097 A | 12/1987 | Hashimoto |
| 4,718,005 A | 1/1988 | Feigenbaum et al. |
| 4,720,782 A | 1/1988 | Kovalcin |
| 4,734,865 A | 3/1988 | Scullion et al. |
| 4,740,890 A | 4/1988 | William |
| 4,745,468 A | 5/1988 | Von Kohorn |
| 4,747,139 A | 5/1988 | Taaffe |
| 4,754,262 A | 6/1988 | Hachett et al. |
| 4,757,533 A | 7/1988 | Allen et al. |
| 4,769,697 A | 9/1988 | Gilley et al. |
| 4,791,565 A | 12/1988 | Dunham et al. |
| 4,821,178 A | 4/1989 | Levin et al. |
| 4,825,354 A | 4/1989 | Agrawal et al. |
| 4,827,508 A | 5/1989 | Shear |
| 4,866,769 A | 9/1989 | Karp |
| 4,876,592 A | 10/1989 | Von Kohorn |
| 4,914,689 A | 4/1990 | Quade et al. |
| 4,926,162 A | 5/1990 | Pickell |
| 4,926,255 A | 5/1990 | Von Kohorn |
| 4,940,976 A | 7/1990 | Gastouniotis et al. |
| 4,943,963 A | 7/1990 | Waechter et al. |
| 4,956,769 A | 9/1990 | Smith |
| 4,970,644 A | 11/1990 | Berneking et al. |
| 4,972,503 A | 11/1990 | Zurlinden |
| 4,977,594 A | 12/1990 | Shear |
| 5,023,907 A | 6/1991 | Johnson et al. |
| 5,032,979 A | 7/1991 | Hecht et al. |
| 5,034,807 A | 7/1991 | Von Kohorn |
| 5,057,915 A | 10/1991 | Von Kohorn |
| 5,086,386 A | 2/1992 | Islam |
| 5,113,518 A | 5/1992 | Durst, Jr. et al. |
| 5,128,752 A | 7/1992 | Von Kohorn |
| 5,182,770 A | 1/1993 | Medveczky et al. |
| 5,204,897 A | 4/1993 | Wyman |
| 5,214,780 A | 5/1993 | Ingoglia et al. |
| 5,222,874 A | 6/1993 | Unnewehr et al. |
| 5,233,642 A | 8/1993 | Renton |
| 5,283,734 A | 2/1994 | Von Kohorn |
| 5,287,408 A | 2/1994 | Samson |
| 5,317,635 A | 5/1994 | Stirling et al. |
| 5,343,239 A | 8/1994 | Lappington et al. |
| 5,355,484 A | 10/1994 | Record et al. |
| 5,374,951 A | 12/1994 | Welsh |
| 5,377,269 A | 12/1994 | Heptig et al. |
| 5,388,211 A | 2/1995 | Hornbuckle |
| 5,406,269 A | 4/1995 | Baran |
| 5,410,598 A | 4/1995 | Shear |
| 5,440,738 A | 8/1995 | Bowman et al. |
| 5,444,642 A | 8/1995 | Montgomery et al. |
| 5,450,134 A | 9/1995 | Legate |
| 5,481,294 A * | 1/1996 | Thomas et al. .......... 725/20 |
| 5,483,658 A | 1/1996 | Grube et al. |
| 5,488,648 A | 1/1996 | Womble |
| 5,490,060 A | 2/1996 | Malec et al. |
| 5,497,479 A | 3/1996 | Hornbuckle |
| 5,499,340 A | 3/1996 | Barritz |
| 5,508,731 A | 4/1996 | Von Kohorn |
| 5,519,433 A | 5/1996 | Lappington et al. |
| 5,526,035 A | 6/1996 | Lappington et al. |
| 5,533,021 A | 7/1996 | Brandstad et al. |
| 5,557,334 A | 9/1996 | Legate |
| 5,559,808 A | 9/1996 | Kostreski et al. |
| 5,561,010 A | 10/1996 | Hanyu |
| 5,584,025 A | 12/1996 | Keithley et al. |
| 5,584,050 A | 12/1996 | Lyons |
| 5,590,056 A | 12/1996 | Barritz |
| 5,594,934 A | 1/1997 | Lu et al. |
| 5,606,604 A | 2/1997 | Rosenblatt et al. |
| 5,610,916 A | 3/1997 | Kostreski et al. |
| 5,621,395 A | 4/1997 | Kiyaji et al. |
| 5,638,113 A | 6/1997 | Lappington et al. |
| 5,640,192 A | 6/1997 | Garfinkle |
| 5,646,675 A | 7/1997 | Copriviza et al. |
| 5,646,942 A | 7/1997 | Oliver et al. |
| 5,654,748 A | 8/1997 | Matthews, III |
| 5,666,365 A | 9/1997 | Kostroski |
| 5,675,510 A | 10/1997 | Coffey et al. |
| 5,697,844 A | 12/1997 | Von Kohorn |
| 5,701,582 A | 12/1997 | DeBay |
| 5,713,795 A | 2/1998 | Von Kohorn |
| 5,724,103 A | 3/1998 | Batchelor |
| 5,727,129 A | 3/1998 | Barrett et al. |
| 5,729,549 A | 3/1998 | Kostreski et al. |
| 5,732,218 A | 3/1998 | Bland et al. |
| 5,734,413 A | 3/1998 | Lappington et al. |
| 5,734,720 A | 3/1998 | Salganicoff |
| 5,740,549 A | 4/1998 | Reilly et al. |
| 5,745,760 A | 4/1998 | Kawamura et al. |
| 5,751,707 A | 5/1998 | Voit et al. |
| 5,754,938 A | 5/1998 | Herz et al. |
| 5,754,939 A | 5/1998 | Herz et al. |
| 5,758,257 A | 5/1998 | Herz et al. |
| 5,759,101 A | 6/1998 | Von Kohorn |
| 5,761,606 A | 6/1998 | Wolzien |
| 5,764,275 A | 6/1998 | Lappington et al. |
| 5,768,382 A | 6/1998 | Schneier et al. |
| 5,771,354 A | 6/1998 | Crawford |
| 5,774,664 A | 6/1998 | Hidary et al. |
| 5,778,182 A | 7/1998 | Cathey et al. |
| 5,787,253 A | 7/1998 | McCreery et al. |
| 5,793,410 A | 8/1998 | Rao |
| 5,796,633 A | 8/1998 | Burgess et al. |
| 5,796,952 A | 8/1998 | Davis et al. |
| 5,812,928 A | 9/1998 | Watson |
| 5,819,156 A | 10/1998 | Belmont |
| 5,833,468 A | 11/1998 | Guy et al. |
| 5,848,396 A | 12/1998 | Gerace |
| 5,857,190 A | 1/1999 | Brown |
| 5,872,588 A | 2/1999 | Aras et al. |
| 5,878,384 A | 3/1999 | Johnson et al. |
| 5,887,140 A | 3/1999 | Itsumi et al. |
| 5,892,917 A | 4/1999 | Myerson |
| 5,905,713 A | 5/1999 | Anderson et al. |
| 5,937,392 A | 8/1999 | Alberts |
| 5,944,780 A | 8/1999 | Chase et al. |
| 5,945,988 A | 8/1999 | Williams et al. |
| 5,951,642 A | 9/1999 | Onoe et al. |
| 5,964,839 A | 10/1999 | Johnson et al. |
| 5,974,549 A | 10/1999 | Golan |
| 5,978,842 A | 11/1999 | Noble et al. |
| 5,987,611 A | 11/1999 | Freund |
| 5,991,807 A | 11/1999 | Schmidt et al. |
| 5,999,912 A | 12/1999 | Wodarz et al. |
| 6,006,217 A | 12/1999 | Lumsden |
| 6,006,332 A | 12/1999 | Rabne et al. |
| 6,018,619 A | 1/2000 | Allard et al. |
| 6,061,082 A | 5/2000 | Park |
| 6,061,719 A | 5/2000 | Bendinelli et al. |
| 6,108,637 A | 8/2000 | Blumenau |
| 6,115,680 A | 9/2000 | Coffee et al. |
| 6,138,155 A | 10/2000 | Davis et al. |
| 6,199,206 B1 | 3/2001 | Nishioka et al. |
| 6,202,210 B1 | 3/2001 | Ludtke |
| 6,222,542 B1 | 4/2001 | Poreh et al. |
| 6,286,140 B1 | 9/2001 | Ivanyi |

(56) References Cited

U.S. PATENT DOCUMENTS

| | | |
|---|---|---|
| 6,353,929 B1 | 3/2002 | Houston |
| 6,421,445 B1 | 7/2002 | Jensen et al. |
| 6,477,707 B1 | 11/2002 | King et al. |
| 6,510,462 B2 | 1/2003 | Blumenau |
| 6,567,978 B1 | 5/2003 | Jarrell |
| 6,574,594 B2 | 6/2003 | Pitman et al. |
| 6,604,239 B1 | 8/2003 | Kohen |
| 6,704,929 B1 | 3/2004 | Ozer et al. |
| 6,745,011 B1 | 6/2004 | Hendrickson et al. |
| 6,754,470 B2 | 6/2004 | Hendrickson et al. |
| 6,779,187 B1 | 8/2004 | Hammond |
| 6,961,765 B2 | 11/2005 | Terry |
| 6,970,924 B1 | 11/2005 | Chu et al. |
| 7,039,928 B2 | 5/2006 | Kamada et al. |
| 7,206,494 B2 | 4/2007 | Engle et al. |
| 7,607,147 B1 | 10/2009 | Lu et al. |
| 7,644,422 B2 | 1/2010 | Lu et al. |
| 2001/0028662 A1 | 10/2001 | Hunt et al. |
| 2001/0044751 A1 | 11/2001 | Pugliese, III et al. |
| 2001/0047517 A1 | 11/2001 | Christopoulos et al. |
| 2001/0056405 A1 | 12/2001 | Muyres et al. |
| 2002/0002488 A1 | 1/2002 | Muyres et al. |
| 2002/0032904 A1 | 3/2002 | Lerner |
| 2002/0053078 A1 | 5/2002 | Holtz et al. |
| 2002/0056086 A1 | 5/2002 | Yuen |
| 2002/0056089 A1 | 5/2002 | Houston |
| 2002/0059576 A1 | 5/2002 | Feininger et al. |
| 2002/0065826 A1 | 5/2002 | Bell et al. |
| 2002/0087967 A1 | 7/2002 | Conkwright et al. |
| 2002/0087969 A1 | 7/2002 | Brunheroto et al. |
| 2002/0101083 A1 | 8/2002 | Toledano et al. |
| 2002/0111934 A1 | 8/2002 | Narayan |
| 2002/0133412 A1 | 9/2002 | Oliver et al. |
| 2003/0037333 A1 | 2/2003 | Ghashghai et al. |
| 2003/0041141 A1 | 2/2003 | Abdelaziz et al. |
| 2003/0056208 A1 | 3/2003 | Kamada et al. |
| 2003/0070167 A1 | 4/2003 | Holtz et al. |
| 2003/0088674 A1 | 5/2003 | Ullman et al. |
| 2003/0110485 A1 | 6/2003 | Lu et al. |
| 2003/0163602 A1* | 8/2003 | Johnson et al. ............... 709/328 |
| 2003/0177371 A1 | 9/2003 | Rothrock et al. |
| 2004/0010798 A1 | 1/2004 | Galli et al. |
| 2004/0031045 A1 | 2/2004 | Ivanyi |
| 2004/0088684 A1 | 5/2004 | Gazdik et al. |
| 2004/0103426 A1 | 5/2004 | Ludvig et al. |
| 2004/0237071 A1 | 11/2004 | Hollander et al. |
| 2005/0266923 A1 | 12/2005 | Ishii et al. |
| 2006/0015902 A1 | 1/2006 | Matsuura et al. |
| 2006/0085812 A1 | 4/2006 | Shishegar et al. |
| 2006/0156397 A1* | 7/2006 | Dai .............................. 726/22 |

FOREIGN PATENT DOCUMENTS

| | | |
|---|---|---|
| CN | 1286429 | 3/2001 |
| CN | 101262292 | 9/2008 |
| DE | 69736435 | 12/2006 |
| EP | 0309269 | 3/1989 |
| EP | 0325219 | 7/1989 |
| EP | 0703683 | 3/1996 |
| EP | 0744695 | 11/1996 |
| EP | 1089201 | 4/2001 |
| EP | 1089564 | 4/2001 |
| EP | 0944991 | 8/2006 |
| GB | 2176639 | 12/1986 |
| JP | 5324352 | 12/1993 |
| JP | 5347648 | 12/1993 |
| JP | 6085966 | 3/1994 |
| JP | 7123392 | 5/1995 |
| JP | 2002247610 | 8/2002 |
| WO | 8907868 | 8/1989 |
| WO | WO9217027 | 10/1992 |
| WO | 9600950 | 1/1996 |
| WO | 9617467 | 6/1996 |
| WO | 9628904 | 9/1996 |
| WO | 9632815 | 10/1996 |
| WO | 9637983 | 11/1996 |
| WO | 9641495 | 12/1996 |
| WO | 9715007 | 4/1997 |
| WO | 9826529 | 6/1998 |
| WO | 9826571 | 6/1998 |
| WO | 9831155 | 7/1998 |
| WO | 0119088 | 3/2001 |
| WO | 0124027 | 4/2001 |
| WO | 02098029 | 12/2002 |

OTHER PUBLICATIONS

Pietrek, M., "Peering Inside the PE: A Tour of the Win32® Portable Executable File Format", (Mar. 1994), Microsoft Systems Journal, vol. 9, No. 3, pp. 15-34.*

Richter, J., "Load Your 32-bit DLL into Another Process's Address Space Using INJLIB", (May 1994), Microsoft Systems Journal, vol. 9, No. 5, pp. 13-38.*

Pietrek, M., "Learn System-Level Win32® Coding Techniques by Writing an API Spy Program", (Dec. 1994), Microsoft System Journal, vol. 9, No. 12, pp. 17-44.*

Merriam-Webster's Collegiate Dictionary, 10th Ed, 1999, pp. 1301-1302.*

Wright, R.; Lipchak, B., "OpenGL SuperBible," 3rd Edition (Jun. 30, 2004), Sams Publishing, pp. 679-685.*

Dictionary.com Unabridged. Random House, Inc. (Jan. 14, 2014) [retrieved from http://dictionary.reference.com/browse/copy?s=t].*

Ayres, J., "Tomes of Delphi: Win32 Core API Windows 2000 Edition" (2002), Wordware Publishing, Inc., pp. 634-642.*

Allapi Network, "GetWindowsText" (Feb 1, 2001), pp. 1-2 [retrieved from http://allapi.mentalis.org/apilist/GetWindowText.shtml].*

Betaman, C., "Windows98_FirstEdition_WebTV.avi" (Jan 7, 2010), pp. 1-10 [retrieved from http://www.youtube.com/watch?v=IKZyi_eb0dM].*

"Decode." Merriam-Webster.com. Merriam-Webster, n.d. Web. Aug. 4, 2015, pp. 1-4 [retrieved from http://www.merriam-webster.com/dictionary/decode].*

Office Action, issued by the United States Patent and Trademark Office on Mar. 29, 1999, in connection with U.S. Appl. No. 08/763,750, 4 pages.

Office Action, issued by the United States Patent and Trademark Office on Aug. 19, 1999, in connection with U.S. Appl. No. 08/763,750, 7 pages.

Office Action, issued by the United States Patent and Trademark Office on Jan. 17, 2001, in connection with U.S. Appl. No. 08/763,750, 17 pages.

Office Action, issued by the United States Patent and Trademark Office on Sep. 11, 2001, in connection with U.S. Appl. No. 08/763,750, 19 pages.

Office Action, issued by the United States Patent and Trademark Office on Sep. 10, 2002, in connection with U.S. Appl. No. 08/763,750, 14 pages.

Office Action, issued by the United States Patent and Trademark Office on Nov. 27, 2002, in connection with U.S. Appl. No. 08/763,750, 11 pages.

Office Action, issued by the United States Patent and Trademark Office on May 15, 2003, in connection with U.S. Appl. No. 08/763,750, 16 pages.

Office Action, issued by the United States Patent and Trademark Office on Apr. 6, 2006, in connection with U.S. Appl. No. 08/763,750, 5 pages.

Office Action, issued by the United States Patent and Trademark Office on Sep. 10, 2007, in connection with U.S. Appl. No. 08/763,750, 13 pages.

Office Action, issued by the United States Patent and Trademark Office on Mar. 17, 2008, in connection with U.S. Appl. No. 08/763,750, 13 pages.

Advisory Action, issued by the United States Patent and Trademark Office on Jun. 2, 2008, in connection with U.S. Appl. No. 08/763,750, 3 pages.

Office Action, issued by the United States Patent and Trademark Office on Nov. 17, 2008, in connection with U.S. Appl. No. 08/763,750, 13 pages.

(56) References Cited

OTHER PUBLICATIONS

Notice of Allowance and Fee(s) Due, issued by the United States Patent and Trademark Office on Apr. 16, 2009, in connection with U.S. Appl. No. 08/763,750, 4 pages.

Office Action, issued by the United States Patent and Trademark Office on Oct. 5, 2007, in connection with U.S. Appl. No. 10/284,409, 10 pages.

Office Action, issued by the United States Patent and Trademark Office on Mar. 18, 2008, in connection with U.S. Appl. No. 10/284,409, 11 pages.

Advisory Action, issued by the United States Patent and Trademark Office on Jun. 3, 2008, in connection with U.S. Appl. No. 10/284,409, 3 pages.

Office Action, issued by the United States Patent and Trademark Office on Dec. 30, 2008, in connection with U.S. Appl. No. 10/284,409, 11 pages.

Office Action, issued by the United States Patent and Trademark Office on Jun. 18, 2009, in connection with U.S. Appl. No. 10/284,409, 9 pages.

Advisory Action, issued by the United States Patent and Trademark Office on Aug. 19, 2009, in connection with U.S. Appl. No. 10/284,409, 3 pages.

Notice of Allowance and Fee(s) Due, issued by the United States Patent and Trademark Office on Oct. 8, 2009, in connection with U.S. Appl. No. 10/284,409, 9 pages.

Patent Cooperation Treaty, "International Preliminary Examination Report," in connection with International Appplication No. PCT/US97/21643, issued on Mar. 30, 1999, 5 pages.

International Preliminary Examination Authority, "Written Opinion," in connection with International Application No. PCT/US97/21643, issued on Feb. 24, 1999, 7 pages.

International Searching Authority, "International Search Report," in connection with International Application No. PCT/US97/21643, issued on Nov. 12, 1998, 15 pages.

English Translation of Japanese Patent Office, Notification Document of Refusal Reasons, mailed on Oct. 21, 2008, in connection with corresponding Japenese Application No. 526729, 8 pages.

Canadian Office Action, issued by the Canadian Intellectual Property Office on Jul. 20, 2009, in connection with Canadian Application No. 2,279,847, 2 pages.

Software Inventorying Technology "Tally Systems Patents Software Inventorying Technology" Jul. 1, 1996, 5 pages.

"PC-Meter Predicts Happy Holidays for Computer Manufacturers and Retailers," http://www.npd.com:80/meterpr3.htm on Jul. 1, 1996, 2 pages.

"PC-Meter Now in 1,000 Households Nationwide," from http://www.npd.com:80/meterpr2.htm on Jul. 1, 1996 , 2 pages.

"NPD's PC-Meter Service to Provide More Accurate Measure of World Wide Web Traffic," from http://www.npd.com:80/meterpr.htm on Jul. 1, 1996, 1 page.

"America Online is Leading Destination of Web Surfers in First-ever PC-Meter Sweeps Citing Top 25 Web Sites," from http://www.npd.com:80/meterpr5.htm on Jul. 1, 1996, 3 pages.

"First Demographic Data on Home World Wide Web Use Now Available from the NPD Group," from http://www.npd/com:80/meterpr6.htm on Jul. 1, 1996, 2 pages.

"Latest NPD Survey Finds World Wide Web Access From Homes Grew Fourfold in Second Half of 1995," from http://www.npd.com:80/meterpr4.htm on Jul. 1, 1996, 2 pages.

C. Graziano, "Cash, Check, or Charge?", LAN Times, Apr. 24, 1995, 2 pages.

Marketing News, Jun. 3, 1996, Section: 1996 Business Report on the Marketing Research Industry, 34 pages.

E. English, "The Meter's Running," LAN Times, Mar. 27, 1995, 2 pages.

Print of page from The Worldwide Web, http://www.npd.com:80/pcmpr.htm on Jul. 1, 1996, 2 pages.

Print of page from The Worldwide Web, http://www.npd.com:80/pcmeter.htm on Jul. 1, 1996, 1 page.

Print of page from the Worldwide Web, http://www.npd.com/pcmdef.htm on Jul. 1, 1996, 2 pages.

M. Brownstein, "Streamlined and Ready for Action," pp. 81, 83-86, 88, 90, 95-96, Netguide (1996), 10 pages.

D. Hoffman et al., "How Big is the Internet," Aug. 18, 1994, 3 pages.

"The Top Five Advertising Agencies Now Subscribe to PC-Meter Web Measurement Service," at http://www.npd.com:80/pcmpr10.htm on Jul. 1, 1996, 2 pages.

R. Lisle, "The management features in software-metering tools can save you a bundle," LAN Times, Jul. 3, 1995, 3 pages.

Helinski, P., "Automating Web-Site Maintenance Part 2:Perl-Based Tools to Manage Your Web Site," Web Techniques, vol. 1, No. 9, XP-002048313:pp. 75,76, and 78 (Dec. 1996), 3 pages.

Lafferty, M., "Taking the PC Out of the Data Comm Loop:New Techniques Bring Mass Market and Net Together on TV," CED:Communications Engineering & Design, vol. 22, No. 9, XP-002079179:pp. 34-38 (Aug. 1996), 5 pages.

Australian Intellectual Property Office, "Notice of Acceptance," issued in connection with Australian Patent Application Serial No. 52668/98, on Jun. 27, 2000 (2 pages).

Australian Intellectual Property Office, "Examiner's First Report," issued in connection with Australian Patent Application Serial No. 52668/98, on Feb. 11, 2000 (1 page).

The State Intellectual Property Office of China, "Notice of Acceptance of the Request for Reexamination," issued in connection with Chinese Patent Application Serial No. 97182123.2, on May 18, 2005, with its English language translation (2 pages).

The State Intellectual Property Office of China, "Decision of Reexamination," issued in connection with Chinese Patent Application Serial No. 97182123.2, on Jul. 6, 2005, with its English language translation (2 pages).

The State Intellectual Property Office of China, "Notice of Completion of Formalities for Patent Registration," issued in connection with Chinese Patent Application Serial No. 97182123.2, on Jan. 25, 2008, with its English language translation (5 pages).

The State Intellectual Property Office of China, "First Office Action," issued in connection with Chinese Patent Application Serial No. 97182123.2, on Dec. 13, 2002, with its English language translation (11 pages).

The State Intellectual Property Office of China, "First Notification of Office Action," issued in connection with Chinese Patent Application Serial No. 97182123.2, on Jul. 3, 2009, with its English language translation (7 pages).

European Patent Office, "Decision to Grant a European Patent Pursuant to Article 97(2) EPC," issued in connection with European Patent Application Serial No. 97947628.0, on Jul. 6, 2006 (1 page).

European Patent Office, "Communication Under Rule 51(4) Epc," issued in connection with European Patent Application Serial No. 97947628.0, on Feb. 7, 2006 (6 pages).

European Patent Office, "Communication Pursuant to Article 96(2) EPC," issued in connection with European Patent Application Serial No. 97947628.0, on Apr. 29, 2005 (3 pages).

European Patent Office, "Communication Pursuant to Article 96(2) EPC," issued in connection with European Patent Application Serial No. 97947628.0, on Jul. 19, 2004 (3 pages).

Japanese Patent Office, "Notice of Allowance," issued in connection with Japanese Patent Application Serial No. Hei 10-526729, on Oct. 27, 2009, with its English language translation (5 pages).

Japanese Patent Office, "Decision of Rejection," issued in connection with Japanese Patent Application Serial No. Hei 10-526729, on Apr. 7, 2009, with its English language translation (5 pages).

Australian Intellectual Property Office, "Examiner's First Report," issued in connection with Australian Patent Application Serial No. 71527/00, on May 21, 2002 (1 page).

Australian Intellectual Property Office, "Response to Applicant's Request Under Section 104 of the Patents Act 1990," issued in connection with Australian Patent Application Serial No. 71527/00, on Jan. 16, 2001 (1 page).

Australian Intellectual Property Office, "Notice of Acceptance," issued in connection with Australian Patent Application Serial No. 71524/00, on Sep. 9, 2003 (2 pages).

(56) References Cited

OTHER PUBLICATIONS

Australian Intellectual Property Office, "Examiner's First Report," issued in connectionwith Australian Patent Application Serial No. 71524/00, on May 21, 2002 (2 pages).
Australian Intellectual Property Office, "Examiner's First Report," issued in connection with Australian Patent Application Serial No. 71525/00, on May 21, 2002 (1 page).
Australian Intellectual Property Office, "Notice of Acceptance," issued in connection with Australian Patent Application Serial No. 71526/00, on Sep. 9, 2003 (2 pages).
Australian Intellectual Property Office, "Examiner's First Report," issued in connection with Australian Patent Application Serial No. 71526/00, on May 21, 2002 (1 page).
Examiner's Interview Summary, issued by the United States Patent and Trademark Office on Apr. 30. 2008, in connection with U.S. Appl. No. 08/763,750, 2 pages.
Response to Rule 312 Communication, issued by the United States Patent and Trademark Office on Jun. 26, 2009, in connection with U.S. Appl. No. 08/763,750, 2 pages.
The International Bureau, "International Preliminary Report on Patentability," issued in connection with counterpart international application No. PCT/US2006/037395, mailed Mar. 26, 2009, 8 pages.
International Search Report for corresponding international patent application No. PCT/US06/37395, Mailed on Jul. 18, 2008, 5 pages.
Written Opinion for corresponding international patent application No. PCT/US06/37395, Mailed on Jul. 18, 2008, pp. 7 pages.
Office Action, issued by the Intellectual Property Office of the Australian Government in connection with Australian patent application No. 2006294861, on Sep. 27, 2011, 1 page.
Text of the First Office Action, issued by the State Intellectual Property Office of China P.R. in connection with Chinese Application No. 200680039792.7, on Aug. 17, 2011, 8 pages.
European Search Report, issued by the European Patent Office in connection with European Application No. 06815422.8-1224/ 1922654, on Sep. 1, 2011, 7 pages.
Australian office action, issued by the Australian Intellectual Property Office on Jan. 25, 2012, in connection with Australian patent application No. 2006294861, 2 pages.
Notice of Allowance, issued by the Australian Intellectual Property Office in connection with Australian Patent Application 2006294861, on Mar. 22, 2013, 1 page.
Canadian Office Action, issued by the Canadian Intellectual Property Office in connection with Canadian Patent Application 2,623,697, on Dec. 11, 2012, 2 pages.
European Office Action, issued by the European Patent Office in connection with European patent application No. 06815422.8-1247, on Jul. 11, 2012, 5 pages.
2nd Notification of Office Action, issued by the State Intellectual Property Office of China in connection with Chinese patent application No. 200680039792.7, on Jun. 5, 2012, 12 pages.
Australian Notice of Allowance, issued by the Australian Government in connection with Australian Application No. 2006294861, on Aug. 28, 2012, 3 pages.
Notice of Preliminary Rejection, with English translation, issued by the Korean Intellectual Property Office in connection with Korean Patent Application 10-2008-7009707, on Jun. 28, 2013, 10 pages.
4th Notification of Office Action, issued by the State Intellectual Property Office of China in connection with Chinese patent application No. 200680039792.7 on Jul. 3, 2013, 4 pages.
4th Notification of Office Action, English translation, issued by the State Intellectual Property Office of China in connection with Chinese patent application No. 200680039792.7 on Jul. 3, 2013, 4 pages.
Canadian Intellectual Property Office, "Office Action," issued in corresponding Canadian Application No. 2,623,697, dated Nov. 25, 2013 (2 pages).
Korean Intellectual Property Office, "Notice of Final Rejection," with English Translation, issued in corresponding Korean Application No. 10-2008-7009707, dated Oct. 31, 2013 (3 pages).
European Patent Office, "Office Action," issued in connection with European Patent Application No. 06815422.8, dated Nov. 15, 2013 (6 pages).
State Intellectual Property Office of China, "Fifth Office Action and English Translation," issued in connection with corresponding Chinese Patent Application No. 200680039792.7, mailed Jun. 9, 2014 (10 pages).
Canadian Intellectual Property Office, "Notice of Allowance," issued in connection with Canadian Patent Application No. 2,623,697, mailed Jan. 7, 2015 (1 page).
Korean Intellectual Property Office, "Notice of Allowance," issued in connection with corresponding Korean Patent Application No. 10-2008-7009707, mailed Nov. 20, 2014 (4 pages).
State Intellectual Property Office of China, "Decision of Rejection," issued in connection with Chinese Patent Application No. 200680039792.7, mailed Feb. 6, 2015 (13 pages).

\* cited by examiner

METHODS AND APPARATUS FOR METERING COMPUTER-BASED MEDIA PRESENTATION

RELATED APPLICATIONS

This patent is a continuation of PCT application PCT/US2006/037395 filed on Sep. 26, 2006, which claims priority from U.S. Provisional Application Ser. No. 60/720,391, entitled "Methods and Apparatus for Metering Computer-Based Video," filed on Sep. 26, 2005, both of which are hereby incorporated by reference in their entireties.

FIELD OF THE DISCLOSURE

This disclosure relates generally to computer-based media and, more particularly, to methods and apparatus for metering the presentation of computer-based media.

BACKGROUND

Content providers, broadcasters, studios, advertisers, publishers, etc. are interested in measuring and/or statistically analyzing the viewing and/or exposure of portions of media to demographic groups. For example, advertisers are interested in verifying overall effectiveness, reach and/or audience demographics for particular advertisements placed in particular videos, shows, movies, audio streams, commercials, audio files, etc. Likewise, broadcasters are interested in being able to demonstrate the effectiveness, reach and/or audience demographics of media viewed via their networks and/or content delivery systems in order to, for example, establish an appropriate advertisement rate.

DETAILED DESCRIPTION

Although the example apparatus and methods described herein include, among other components, software executed on hardware, such apparatus and methods are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

In addition, while the following disclosure is made with respect to an example personal computer (PC) based video display system, it should be understood that the disclosed apparatus is readily applicable to many other computer-based and/or electronic media display systems and/or devices such as, but not limited to, handheld computing devices (e.g., iPods, personal digital assistants (PDAs), MP3 players, multimedia players, Playstation portables (PSPs), smart phones, etc.) or cellular telephones. Accordingly, while the following describes example apparatus, methods, and articles of manufacture, persons of ordinary skill in the art will readily appreciate that the disclosed examples are not the only way to implement such systems. For instance, a television (TV) may have an embedded, attached and/or coupled electronic device, electronic system, computing device, computing system, and/or PC configured to receive and/or decode a video signal, display a video signal, and meter viewing statistics and/or program consumption. For example, a digital video recorder attached to a TV, a TV with an integrated digital video recorder and/or digital versatile disc (DVD) player, etc.

While example apparatus and methods to meter computer-based display of video are described herein, persons of ordinary skill in the art will readily appreciate that the disclosed apparatus and methods may be used, additionally or alternatively, to meter the presentation of any of a variety of additional and/or alternative types of media including, for example, audio, audio streams, commercials, mixed audio and/or video, images, text, data file, file, etc.

In general, the example apparatus, methods, and articles of manufacture described herein may be used to determine video viewership statistics and/or program consumption characteristics. In the particular examples described herein, data is collected that characterizes the viewing, consumption and/or display of video from, for example, a DVD, a compact disc (CD), an Internet site and/or a hard drive, and television (TV) programs from, for example, a terrestrial broadcast, a cable broadcast, a satellite broadcast, and/or an Internet broadcast.

Figure 1:
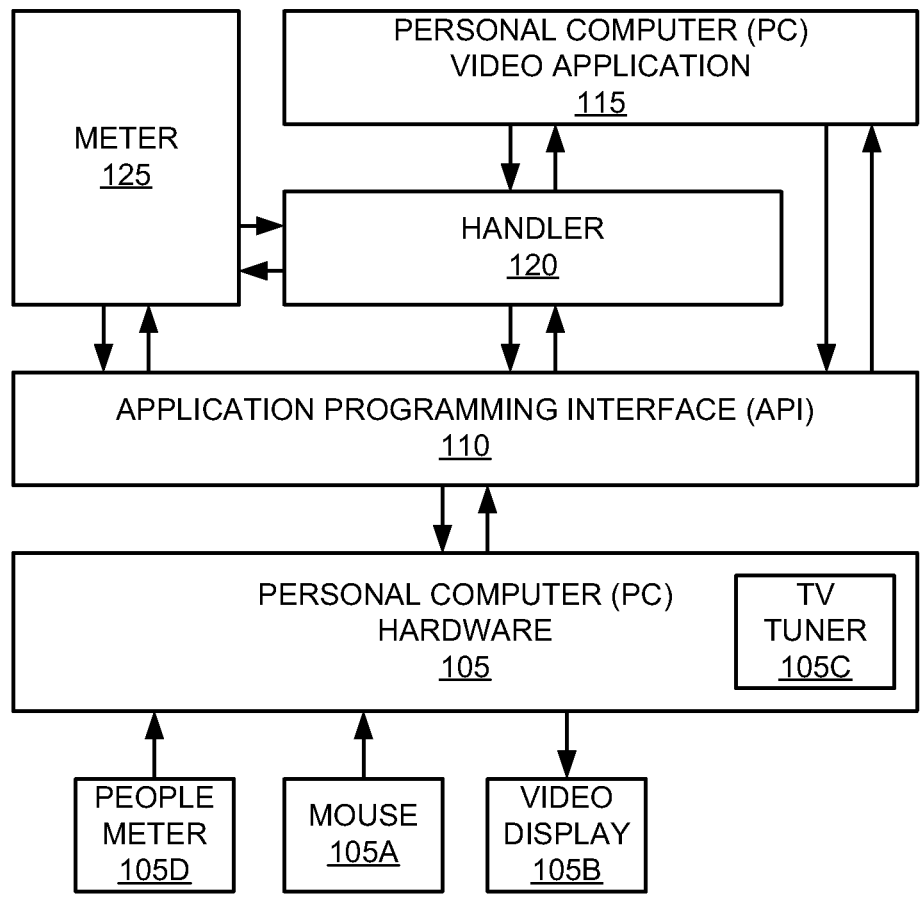
FIG. 1 is a schematic illustration of an example metering system for computer-based video constructed in accordance with the teachings of the invention.

FIG. 1 illustrates an example system for metering the display of PC based video constructed in accordance with the teachings of the invention to monitor and log video viewing and/or program consumption by one or more viewers of PC based video. Although an embodiment of the system discussed herein relates to metering the viewing of TV programs on a PC, it will be readily apparent to persons of ordinary skill in the art that the metering system of FIG. 1 can be applied to other forms of video display by a PC. For example, Internet based streaming video, DVD, CD, hard disk drive, etc. Further, it is known that TV programs may be provided to a PC via terrestrial broadcast, cable broadcast, satellite broadcast, Internet based streaming video, DVD, CD, etc.

To interact with a user (i.e., viewer of the PC based video) and to receive and display video programs, the example system of FIG. 1 includes hardware 105, an application programming interface (API) 10, and a media presentation application (e.g., a PC video application) 115 that emits any of a variety of types of media (e.g., video). In the illustrated example of FIG. 1, the hardware 105 is implemented using any suitable well-known personal computer, computing platform, computer server, etc. capable of receiving TV signals, receiving user inputs, and presenting (e.g., displaying signals on) a display device 105B. The hardware 105 is configured to operate (i.e., execute) any one of a variety of operating systems such as, for instance, Windows XP™, Windows NT™, Mac OS X™, Linux, Unix, etc.

In the illustrated example of FIG. 1, the hardware 105 includes, among other things, circuitry to tune and receive TV signals from an antenna, satellite receiver, cable, cable set-top box, etc. (e.g., a TV tuner device contained on a peripheral component interconnect (PCI) card 105C), circuitry to receive and decode streaming video, decode video from DVD or compact disc (CD) discs, etc. Alternatively, or additionally, the hardware 105 includes a connection to a TV tuner device 105C, a DVD drive, a CD drive, etc. The hardware 105 also includes, and/or provides a suitable connection to, a display device 105B (e.g., computer display, video display, terminal, television, etc.) capable of displaying TV programs for a viewer of the PC based video. The hardware 105 further includes, and/or provides a suitable connection to, at least one input device (e.g., a keyboard, a mouse 105A, a remote control, a People Meter 105D, etc.) configured to allow the user to select a video source, select a TV station or program, control volume, identify the user, etc. The hardware 105 may optionally include a disk drive, or other suitable storage medium, for recording and replaying recorded TV programs. The People Meter 105D may, additionally or alternatively, be implemented as machine accessible instructions executing, for example, on the PC hardware 105. Example methods and apparatus to implement the example People Meter 105D are described in International Patent Application Serial Number PCT/US04/15377 which is published as International Publication No. 2005/117425, and which is hereby incorporated by reference in its entirety.

In the example of FIG. 1, the API 110 provides an interface between the PC based video application 115 and the hardware 105. For example, the API 110 could provide a generic interface to receive channel selections from the user via an input device without the PC based video application 115 specifically knowing the technical details, brand, etc. of the input device. By including the API 110 in the example of FIG. 1, the PC based video application 115 may be implemented wholly, or at least partially, without specific knowledge of the underlying devices, circuits, PCI cards, etc. comprising the hardware 105. In one embodiment, the API 110 is provided by an operating system and implements a standardized interface between software (e.g., applications) executing on the hardware 105 (e.g., executing on a processor included in the hardware 105) and other portions of the hardware 105. For example, in a Windows XP based operating system a portion of the API 110 is implemented by the dynamic link library (DLL) USER32.DLL which is part of the Windows XP based operating system, that provides functions such as DrawWindow( ), DrawText( ), MousePress( ), KeyPress( ), etc. to enable applications to display information on a display device, receive user inputs, interact with the hardware, etc. Alternatively, a portion of the API 110 may be implemented by another program, device driver, etc. executing under the operating system.

Using any of a variety of techniques, the PC based video application 115 via the API 110 receives input signals and selections (e.g., channel selections, volume, user identification, etc.) from the user via the at least one input device, controls a TV tuning device, receives tuned TV signals from the TV tuning device, creates signals suitable for display on a display device, and sends the display signals to the display device. For example, the PC video application 115 interacts with the hardware 105 by making software API calls to functions provided by the operating system (i.e., the API 110) such as, for instance, DrawText( ) to display TV channel numbers, KeyPress( ) to receive TV channel selections, etc. The example PC video application 115 of FIG. 1 may be implemented as machine readable instructions executing on a processor associated with the hardware 105. However, the PC video application 115 may also be implemented as hardware or a combination of hardware and software.

In the example of FIG. 1, the PC based video application 115 has access via the API 110 and the hardware 105 to an electronic program guide that, for example, specifies which TV programs are available on each TV station for each time period of each day of the week. It will be understood by persons of ordinary skill in the art that the electronic program guide may, for example, be provided as part of TV signals received and decoded by the hardware 105 (e.g., a TV tuning device). Using any of a variety of techniques, the PC based video application 115 provides to the user via a display device 105B at least a portion of the electronic program guide to facilitate selection of TV programs by the user. The PC based video application 115 may also use the electronic program guide to determine and display on the display device the name of the current TV program being viewed by the user.

To monitor and record viewing of TV programs viewed or consumed by the user, the example system of FIG. 1 includes a handler 120 and a meter 125. The handler 120 processes (i.e., handles) all, or a subset of, the function calls, signals, instructions, values, etc. exchanged between the PC based video application 115 and the API 110. For example, the handler 120 could process instructions sent from the PC video application 115 to a TV tuner device (e.g., the TV Tuner device 105C) specifying which TV station to receive; the handler 120 could process portions of the signals sent from the PC video application 115 to a display device (e.g., Video Display 105B) to display for the viewer the current TV program or TV station being viewed; the handler 120 could process signals sent by the PC video application 115 to a disk drive (e.g., contained within the hardware 105) to open a new file into which a TV program is to be recorded, etc.

In one embodiment, the handler 120 is implemented as a metering DLL 120 and uses function call re-direction to process all, or a subset of, software API calls made by the PC video application 115 to the API 110. The metering DLL 120 is programmed and loaded by the operating system such that all, or a subset of, calls made to the API 110 by the PC video application 115 are re-directed to the metering DLL 120. It will be readily apparent to persons of ordinary skill in the art that for a Windows XP based operating system this can be accomplished using standard Windows API calls, for example, VirtualAllocEx( ), WriteProcessMemory( ), LoadLibrary( ) and CreateRemoteThread( ). It will also be readily apparent that the loading of the metering DLL 120 by the operating system causes the metering DLL 120 to execute its own startup routine.

The startup routine for the metering DLL 120, using well-known techniques, modifies and/or replaces at least one entry of the PC video application's 115 IMPORT TABLE (e.g., for DrawText( )) with an address pointing to a replacement function provided by the metering DLL 120. Using this technique, an example software call made to DrawText( ) by the PC video application 115 will instead be automatically re-directed to the metering DLL 120 to execute the replacement function provided by the metering DLL 120. The replacement function provided by the metering DLL 120 may, in turn, make a corresponding software call to the standard DrawText( ) function provided by the API 110 using the address contained in the original PC video application's 115 IMPORT TABLE. The replacement function provided by the metering DLL 120 also passes, using standard operating system messaging techniques and/or function calls, information regarding the received re-directed API software call to the meter 125. It will be well understood that by configuring the number, type, operation, etc. of the replacement functions provided by the metering DLL 120, the standard API calls re-directed to the metering DLL 120 can be adjusted.

To allow proper video display in the example of FIG. 1, the handler 120 passes (i.e., forwards) re-directed function calls, signals, instructions, values, etc. to the API 110. To facilitate monitoring of TV viewing by the user, the handler 120 also passes a copy of appropriate re-directed function calls, signals, instructions, values, etc. (e.g., video source selections, TV channel selections, display mode, user identification, etc.) to the meter 125. In the example of FIG. 1, the handler 120 only re-directs those function calls, signals, instructions, values, etc. useful for monitoring TV viewing by the user (e.g., video source, TV channel selections, user identification, mode, volume muting, etc.). Other function calls, signals, instructions, values, etc. (e.g., volume, etc.) may be directly exchanged or configured between the PC based video application 115 and the API 110. Alternatively, the handler 120 could re-direct all function calls, signals, instructions, values, etc. and pass all or a portion of them to the meter 125.

Figure 2A:
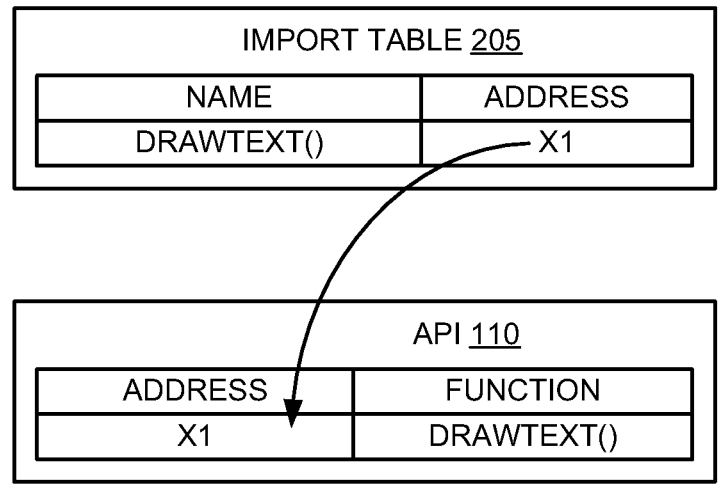
FIGS. 2A and 2B illustrate an example application programming interface function call re-direction.
Figure 2B:
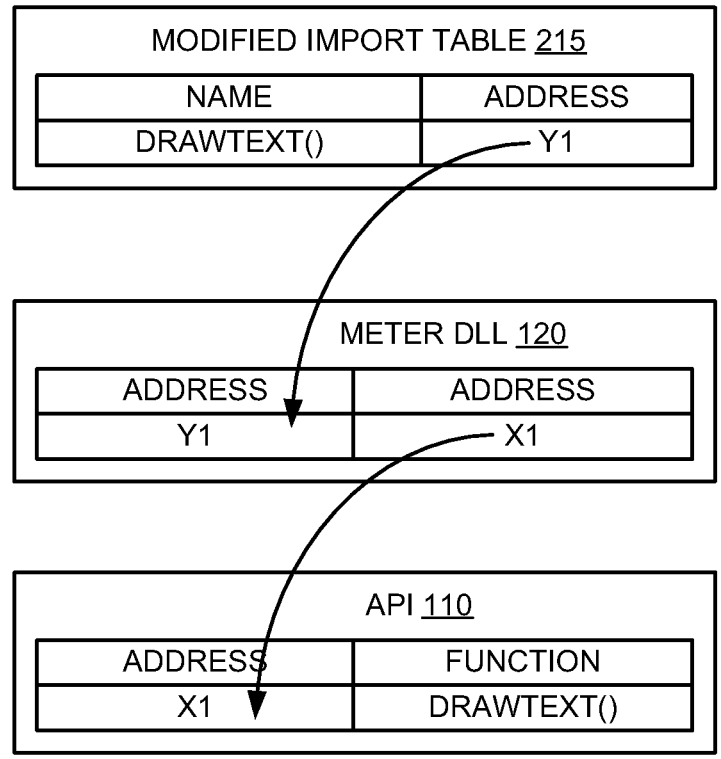

FIG. 2A illustrates an example IMPORT TABLE 205 containing an entry for DrawText( ) that points to an address X1 corresponding to the DrawText( ) function provided by the API 110. FIG. 2B illustrates an example IMPORT TABLE 215 modified by the metering DLL 120 such that calls to the DrawText( ) function made by the PC based video application 115 are re-directed to the metering DLL 120. In particular, the entry for DrawText( ) in the IMPORT TABLE 215 is modified with a new address Y1 corresponding to a replacement function provided by the metering DLL 120. Further, the metering DLL 120 uses the original address X1 to call the original function in the API 110.

Figure 3:
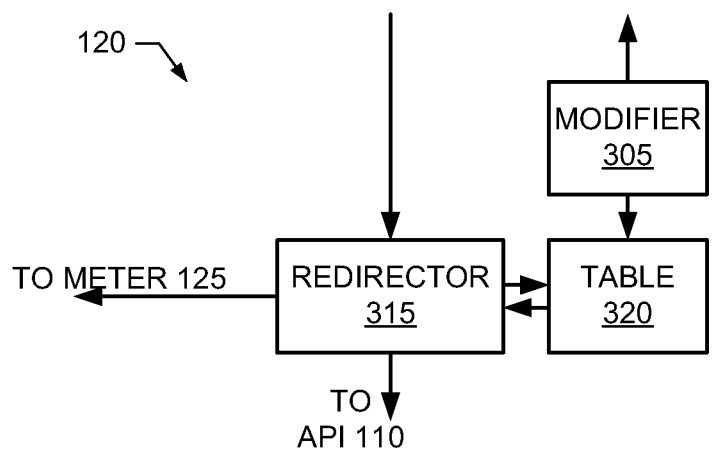
FIG. 3 is a schematic illustration of an example manner of implementing the handler of FIG. 1.

FIG. 3 is a schematic illustration of an example manner of implementing the handler 120 of FIG. 1. To modify the IMPORT TABLE of the PC based video application 115, the example of FIG. 3 includes a modifier 305. As discussed above, the modifier 305 replaces one or more addresses in the IMPORT TABLE of the PC based video application 115 with addresses corresponding to replacement functions in the metering DLL 120. The modifier 305 also creates entries in a table 320 that allow a redirector 315 to correctly forward received re-directed API calls made by the PC based video application 115 to the API 110. To forward re-directed API calls to the API 110 and to pass re-directed API calls to the meter 125, the example handler 120 of FIG. 3 includes the redirector 315. Because the example redirector 315 of FIG. 3 forwards re-directed API calls to the API 110, the correct and/or intended operation(s) of the example PC video application 115 is not interrupted and/or impaired even while video consumption metering is occurring. The example handler 120 of FIG. 3 may be implemented by a DLL as discussed herein, as machine readable instructions executing on a processing element associated with the hardware 105, as dedicated hardware or circuitry, or as a combination of hardware and software.

Returning to FIG. 1, the meter 125 uses information contained in function calls, signals, instructions, values, etc. re-directed to the handler 120 and provided to the meter 125 to monitor and record TV viewing by the user. For example, the meter 125 creates log entries that contain time-of-day, TV station and user identification. The log entries could also contain TV program information (e.g., name of a viewed program, name of a TV station, a channel name, etc.) if that information is displayed on the display device and if the displaying uses a technique that can be re-directed to the handler 120. In the example of FIG. 1, the meter 125 creates a log entry each time a change in TV viewing occurs (e.g., video source change, a TV station change, a volume muting, a program break, an on/off event, a change in user, etc.). The meter 125 may also create log entries periodically or aperiodically during time intervals without changes in TV viewing parameters (e.g., every 15 minutes).

The example system of FIG. 1 periodically or aperiodically provides the recorded (i.e., logged) TV viewing information to a processing server (not shown) that combines the recorded TV viewing information with recorded TV viewing information from other TV metering systems (PC TV or otherwise) to develop meaningful viewership and/or program consumption statistics. For instance, the processing server of the illustrated example uses the combined recorded TV viewing information to determine overall TV viewership ratings and/or rankings for each time period of each day of the week, each TV program, etc. It will be understood by persons of ordinary skill in the art that the meter 125 could provide the recorded TV viewing information to the processing server using any of a variety of techniques. For instance, by periodically or aperiodically recording the information on a non-volatile storage medium (e.g., recordable compact disc (CD-R)) that can be transported (e.g., picked up, mailed, etc.) and then loaded onto the processing server; by uploading (e.g., via an Internet connection, dedicated network or public switched network accessible via the API 110 and the hardware 105) the recorded information to the processing server; etc.

The meter 125 examines the API calls made by the PC video application 115 as re-directed to the metering DLL 120 for information necessary to monitor and log TV viewing by the user. For example, the meter 125 could examine the parameters contained in a call to DrawText( ) to identify if the PC video application 115 is displaying a TV station number and/or TV program name on the display device. As an example, the meter 125 could examine the parameters contained in a FileOpen( ) call to obtain the file name and, thus, the time and TV station information associated with a previously recorded TV program, etc. The example meter 125 utilizes standard API calls to obtain current time-of-day or day-of-the-week information. The meter 125 can be coupled to a People Meter to allow audience members (i.e., viewer) to identify themselves. Alternatively or additionally, the meter 125 could determine a viewer's identity based on who is logged into the operating system. As discussed above, the meter 125 creates a log of TV viewing and periodically or aperiodically provides the log to a processing server.

In the example of FIG. 1, the meter 125, upon startup, causes the metering DLL 120 to be loaded by the operating system (using techniques discussed above) such that at least one PC video application 115 IMPORT TABLE entry is modified. Upon normal termination of the operation of the meter 125, the meter 125 causes the metering DLL 120 to be unloaded by the operating system such that replaced PC video application 115 IMPORT TABLE entries are restored to their original values so that future API calls are made directly to the API 110 and the PC video application 115 can continue operating.

The example meter 125 of FIG. 1 is implemented as machine readable instructions executing on a processor associated with the hardware 105. However, the meter 125 may also be implemented as hardware or a combination of hardware and software.

The methods and apparatus described in this disclosure support a PC video application 115 that uses either standard operating system window controls or well-known "skins." Skins based applications utilize standard API calls (e.g., DrawText( )) to display textual information and, thus, are amenable to indirect data detection via API function call re-direction as described herein. Further, while the examples discussed herein and in connection with FIGS. 2-4 are related to a Windows XP based operating system, it will be readily apparent to persons of ordinary skill in the art that similar techniques could be used for other operating systems (e.g., Windows NT, Windows ME™, Mac OS X, Unix, Linux, etc.).

It will be readily apparent to persons of ordinary skill in the art that the metering DLL 120 could alternatively or additionally examine the parameters of re-directed API calls made by the PC video application 115 for information related to TV viewing by the user(s) (e.g., viewer(s)) and only pass parameters of interest to the meter 125. It will also be readily apparent that the metering DLL 120 could process re-directed non-operating system based API calls made by the PC video application 115. For example, the PC video application 115 may use customized or proprietary functions to interact with the hardware 105 (e.g., an external TV receiver device), for instance, to select a TV station. To the extent that the metering DLL 120 can access and/or decipher any customized or proprietary functions used by the PC video application 115 to interact with the hardware 105 and/or the API 110, the methods described herein can be readily extended to re-direct such customized or proprietary functions.

Figures 4, 5:
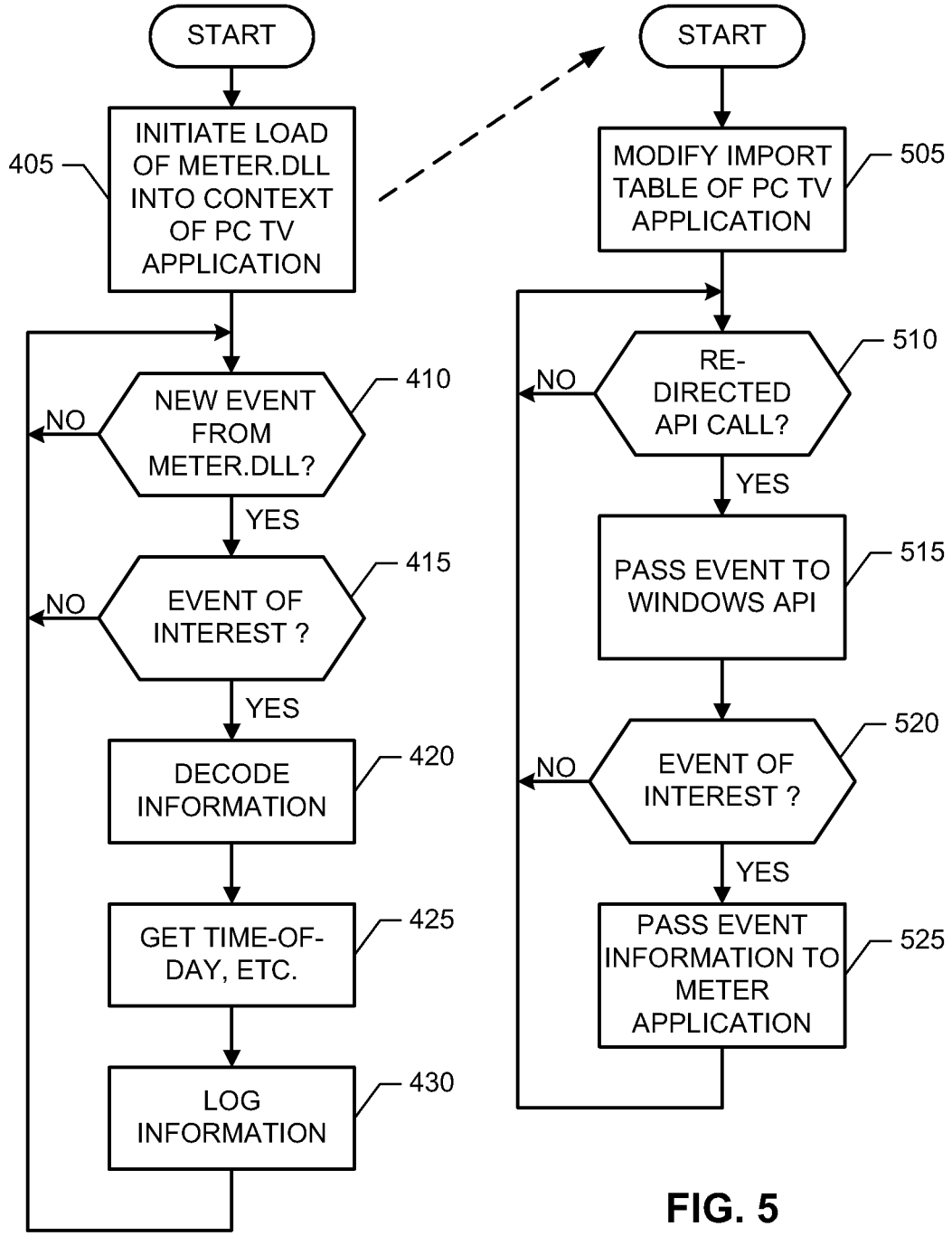
FIG. 4 is a flowchart representative of example machine readable instructions which may be executed to implement the example meter of FIG. 1.
FIG. 5 is a flowchart representative of example machine readable instructions which may be executed to implement the example handler of FIG. 1.

FIGS. 4 and 5 illustrate flowcharts representative of example machine readable instructions that may be executed by a processor (e.g., the processor 610 of FIG. 6) to implement the example handler or metering DLL 120 and the example meter 125 of FIG. 1. The machine readable instructions of FIGS. 4 and/or 5, the example API 110, the example PC video application 115, the example metering DLL 120, the example meter 125 and/or, more generally, the example metering system of FIG. 1 may be executed by a processor, a controller and/or any other suitable processing device. For example, the machine readable instructions represented in FIGS. 4 and/or 5, the example API 110, the example PC video application 115, the example metering DLL 120, the example meter 125 and/or, more generally, the example metering system of FIG. 1 may be embodied in coded instructions stored on a tangible medium such as a flash memory, a read-only memory (ROM) and/or a random-access memory (RAM) associated with the processor 610 shown in the example processor platform 600 and discussed below in conjunction with FIG. 6. Alternatively, some or all of the example machine readable instructions of FIGS. 4 and/or 5, the example API 110, the example PC video application 115, the example metering DLL 120, the example meter 125 and/or the metering system of FIG. 1 may be implemented using any variety of application specific integrated circuit(s) (ASIC(s)), programmable logic device(s) (PLD(s)), field programmable logic device(s) (FPLD(s)), discrete logic, hardware, etc. Also, some or all of the machine readable instructions of FIGS. 4 and/or 5, the example API 110, the example PC video application 115, the example metering DLL 120, the example meter 125 and/or the metering system of FIG. 1 may be implemented manually or as any combination of any of the foregoing techniques. Further, although the example machine readable instructions of FIGS. 4 and 5 are described with reference to the flowcharts of FIGS. 4 and 5, persons of ordinary skill in the art will readily appreciate that many other methods of implementing the example metering DLL 120 and the example meter 125 may be employed. For example, the order of execution of the blocks may be changed, and/or some of the blocks described may be changed, eliminated, sub-divided, or combined. Additionally, persons of ordinary skill in the art will readily appreciate that the example machine accessible instructions of FIGS. 4 and/or 5 may be carried out sequentially and/or carried out in parallel by, for example, separate processing threads, processors, devices, discrete logic, circuits, etc.

The example machine readable instructions of FIG. 4 begin when the meter 125 is started. Using standard API calls (e.g., VirtualAllocEx( ), WriteProcessMemory( ), LoadLibrary( ), CreateRemoteThread( )), the meter 125 causes the operating system (e.g., Windows XP) to load the metering DLL 120 (block 405). The loading of the metering DLL 120 (block 405) by the operating system starts the execution of the example machine readable instructions of FIG. 5 in a processing thread separate from that executing the example machine readable instructions of FIG. 4 (i.e., the meter 125). As discussed above in connection with FIG. 1 and below in connection with FIGS. 4 and 5, the meter 125 (e.g., the machine readable instructions of FIG. 4) and the metering DLL 120 (e.g., the machine readable instructions of FIG. 5) interact to determine video and/or program viewing, display and/or consumption by a person.

The meter 125 then waits for the metering DLL 120 to receive a new re-directed API call and to provide the parameters of the re-directed API call to the meter 125 (i.e., an event) (block 410). If a new event has not occurred (block 410), the meter 125 continues waiting (block 410). If a new event has occurred and information has been received (block 410), the meter 125 determines if the re-directed API call is an event of interest (e.g., DrawText( ), or more generally, an event associated with an interaction between the PC video application 115 and the metering DLL 120) (block 415). If the re-directed API call is not an event of interest (block 415), the meter 125 returns to block 410 to await another event.

If the re-directed API call is an event of interest (block 415), the meter 125 decodes the information re-directed to and received from the metering DLL 120 (e.g., TV channel selection, video source, etc.) (block 420). The meter 125 then acquires time-of-day, day-of-week, user identification, etc. information (block 425), and creates a log entry based on the decoded and acquired information and data (block 430). The meter 125 then returns to block 410 to await another event.

The example machine readable instructions of FIG. 5 begin when the metering DLL 120 is loaded by the operating system (e.g., Windows XP). As discussed above and in connection with FIGS. 2A and 2B, the metering DLL 120 modifies the IMPORT TABLE of the PC video application 115 so that calls to API functions replaced by the metering DLL 120 are re-directed to the metering DLL 120 (block 505). The metering DLL 120 also saves the original IMPORT TABLE entries so that these original entries can be restored when the metering DLL 120 is unloaded by the operating system and so that the metering DLL 120 calls the proper function in the API 110 when API calls are re-directed (block 505).

The metering DLL 120 then waits for one of the replacement functions provided by the metering DLL 120 to be called by the PC video application 115 (i.e., an API call re-direction has occurred) (block 510). If an API call has been re-directed to the metering DLL 120 (block 510), the metering DLL 120 calls the corresponding API function in the API 110 (block 515). By calling the corresponding API function in the API 110, the metering DLL 120 ensures that the PC video application 115 is not interrupted, impaired and/or prevented from correctly presenting video. The metering DLL 120 then determines if the re-directed API call is an event of interest (block 520). For example, by comparing the parameters of a DrawText( ) API call with a character string corresponding to a channel name, channel number, or TV program name (block 520). If the re-directed API call is not an event of interest (block 520), the metering DLL 120 returns to block 510 to await another API call re-direction. If the re-directed API call is an event of interest (block 520), the metering DLL 120 passes the parameters of the re-directed API call to the meter 125 (block 525) and returns to block 510 to await another API call re-direction.

Figure 6:
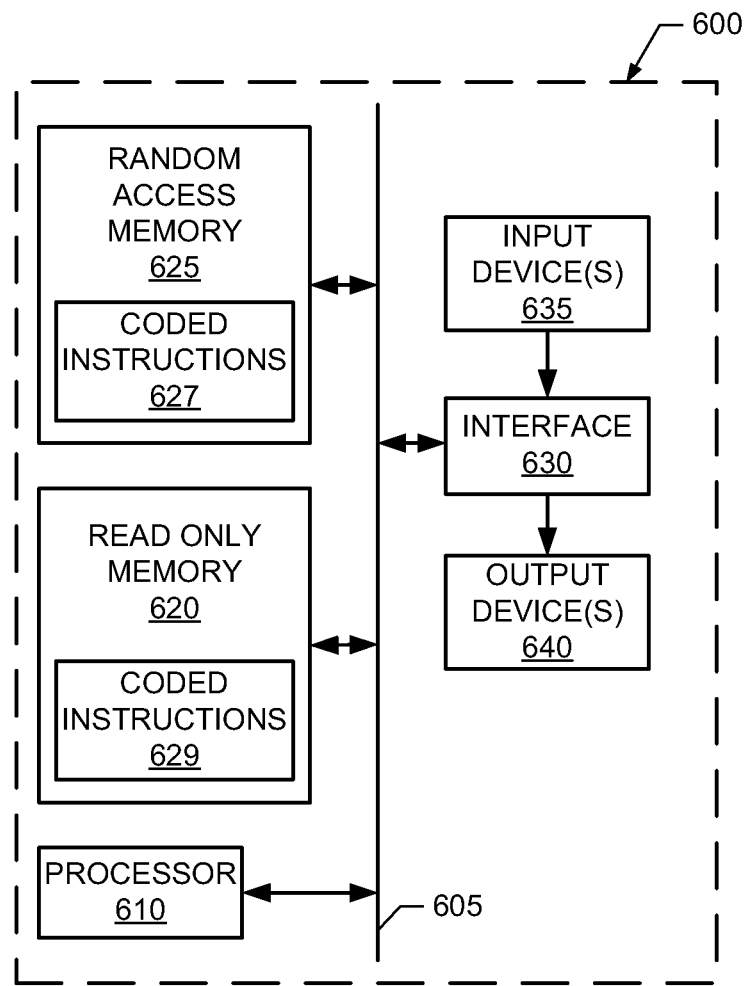
FIG. 6 is a schematic illustration of an example processor platform that may execute the example machine readable instructions represented by FIGS. 4 and/or 5 to implement the example metering system of FIG. 1.

FIG. 6 is a schematic diagram of an example processor platform 600 capable of executing the example machine readable instructions represented in FIGS. 4 and 5, and/or implementing the example API 110, the example PC video application 115, the example metering DLL 120, the example meter 125 and/or, more generally, the metering system of FIG. 1. For example, the processor platform 600 can be implemented by one or more general purpose microprocessors, microcontrollers, etc.

The processor platform 600 of the example of FIG. 6 includes a general purpose programmable processor 610. The processor 610 executes coded instructions 627 and/or 629 present in main memory of the processor 610 (e.g., within a RAM 625 and/or a ROM 620). The processor 610 may be any type of processing unit, such as a microprocessor from the Intel®, AMD®, IBM®, or SUN® families of microprocessors. The processor 610 may implement, among other things, the example machine readable instructions of FIGS. 4 and 5, the example API 110, the example PC video application 115, the example metering DLL 120, the example meter 125 and/or metering system of FIG. 1.

The processor 610 is in communication with the main memory (including a read only memory (ROM) 620 and the RAM 625) via a bus 605. The RAM 625 may be implemented by Synchronous Dynamic Random Access Memory (SDRAM), Dynamic DRAM, and/or any other type of RAM device. The ROM 620 may be implemented by flash memory and/or any other desired type of memory device. Access to the memory 620 and 625 is typically controlled by a memory controller (not shown).

The processor platform 600 also includes an interface circuit 630. The interface circuit 630 may be implemented by any type of well-known interface standard, such as an external memory interface, serial port, general purpose input/output, etc.

One or more input devices 635 and one or more output devices 640 are connected to the interface circuit 630. The input devices 635 and output devices 640 may be used to implement interfaces between a user and the example metering system of FIG. 1.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. For instance, the Windows XP, Mac OS X, Unix, Linux, etc. operating systems represent examples of the current state of the art. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method performed by a computer that is configured to execute an operating system and a media presentation program, the method comprising:

identifying, in a table of functions, a function to cause requested text to be displayed on a display associated with the computer, the function utilized by the media presentation program to display information identifying a media presentation;

modifying the table of functions to cause calls to the function to be re-directed;

forwarding a re-directed call to the function to an application programming interface provided by the operating system to cause text identified in the re-directed call to be displayed;

comparing the text identified in the re-directed call to a character string corresponding to information of interest to determine if the text identified in the re-directed call includes a viewing parameter of interest;

passing the viewing parameter of interest to a meter when the text identified in the re-directed call includes the viewing parameter of interest; and processing the viewing parameter of interest to determine media presentation information to monitor media presentation program viewing by;

decoding the viewing parameter of interest;

acquiring data that is associated with the viewing parameter of interest from the operating system; and creating a log entry based on the decoded viewing parameter of interest and the acquired data.

2. A method as defined in claim 1, further including modifying an address of the media presentation program to re-direct the call.

3. A method as defined in claim 2, wherein the address is stored in a table entry of the media presentation program.

4. A method as defined in claim 3, wherein the table entry is an IMPORT TABLE entry.

5. A method as defined in claim 2, wherein modifying the address includes replacing the address with a second address of a function provided by a monitoring program.

6. A method as defined in claim 2, wherein the viewing parameter is a channel number to be displayed on the display associated with the computer.

7. A method as defined in claim 1, wherein the re-directed call is forwarded to the application programming interface independent of the comparison of the text identified in the re-directed call to the character string corresponding to the information of interest.

8. A method as defined in claim 1, further including processing the media presentation information to determine a media consumption statistic.

9. A method as defined in claim 1, further including providing the media presentation information to a processing server.

10. A method as defined in claim 1, wherein the media presentation information is at least one of a channel number, a channel name, a content name, a program name, a stream name, a file name, a time-of-day, a day-of-week, an original broadcast time, an original transmission time, a record time, or a user identification.

11. A method as defined in claim 1, wherein the re-directed call is a call to a DrawText( ) function to display the information identifying the media presentation on the display associated with the computer.

12. A method as defined in claim 1, wherein the media presentation program, when executed, emits at least one of a television program, a video, a movie, an audio file, an audio stream, text, a commercial, or an image.

13. A method as defined in claim 1, wherein the media presentation program, when executed, receives media from at least one of an antenna, a satellite receiver, a cable receiver, a digital video disc, a compact disc, or an Internet based site.

14. A method as defined in claim 1, wherein the call is re-directed at the media presentation program from a first function provided by the operating system to a second function provided by a monitoring program.

15. A method as defined in claim 1, further including configuring the computer to execute a monitoring program, the monitoring program to modify the media presentation program and process a copy of the re-directed call.

16. A method as defined in claim 1, wherein the computer is at least one of a personal computer, a handheld computing device, a personal digital assistance, a workstation, a cellular telephone, a smart phone, a media player, a television, a digital video recorder, or a digital versatile disc player.

17. A media presentation metering system comprising:
a plurality of computers including:
an operating system;
a media presentation program; and
a monitoring program including a handler to:
identify, in a table of functions, a function to cause requested text to be displayed on a display associated with the computers, the function utilized by the media presentation program to display information identifying a media presentation;
modify the table of functions to cause calls to the function to be re-directed;
forward a re-directed call to the function to an application programming interface provided by the operating system to cause text identified in the re-directed call to be displayed;
compare the text identified in the re-directed call to a character string corresponding to information of interest to determine if the text identified in the re-directed call includes a viewing parameter of interest;
generate an event to include the viewing parameter of interest when the text identified in the re-directed call includes the viewing parameter of interest; and
record parameters characteristic of presentation of media included in the event by:
decoding the viewing parameter of interest from the event;
acquiring data that is associated with the viewing parameter of interest from the operating system; and
creating a log entry based on the decoded viewing parameter of interest and the acquired data; and
a server to process the recorded parameters to determine media presentation statistics.

18. An apparatus to meter a computer that is configured to execute an operating system and a media presentation program, the apparatus comprising:
a handler to:
identify, in a table of functions, a function to cause requested text to be displayed on a display associated with the computer, the function utilized by the media presentation program to display information identifying a media presentation;
modify the table of functions to cause calls to the function to be re-directed;
forward a re-directed call to the function to an application programming interface provided by the operating system to cause text identified in the re-directed call to be displayed;
compare the text identified in the re-directed call to a character string corresponding to information of interest to determine if the text identified in the re-directed call includes a viewing parameter of interest; and
generate an event to include the viewing parameter of interest when the text identified in the re-directed call includes the viewing parameter of interest; and
a meter to process the event to determine media presentation information to monitor media program presentation viewing by:
extracting the viewing parameter of interest from the event;
decoding the viewing parameter of interest;
acquiring data that is associated with the viewing parameter of interest from the operating system; and
creating a log entry based on the decoded viewing parameter of interest and the acquired data.

19. An apparatus as defined in claim 18, wherein the handler includes:
a modifier to modify the media presentation program; and
a re-director to direct the re-directed call to the meter.

20. An apparatus as defined in claim 19, wherein, the re-director is to direct the re-directed call to the application programming interface independent of the handler comparing the text identified in the re-directed call the character string corresponding to the information of interest to determine if the text identified in the re-directed call includes the viewing parameter of interest.

21. An apparatus as defined in claim 18, wherein the handler is to modify an address of the media presentation program to cause the media presentation program to re-direct the call to the handler.

22. An apparatus as defined in claim 21, wherein the address is stored in a table entry of the media presentation program.

23. An apparatus as defined in claim 21, wherein the handler is to replace the address with a second address of a function provided by a monitoring program.

24. An apparatus as defined in claim 21, wherein the viewing parameter of interest is a channel number to be displayed on the display associated with the computer.

25. An apparatus as defined in claim 18, wherein the meter is to provide the media presentation information to a processing server.

26. An apparatus as defined in claim 18, wherein the media presentation information is at least one of a channel number, a channel name, a content name, a program name, a stream name, a file name, a time-of-day, a day-of-week, an original broadcast time, an original transmission time, a record time, or a user identification.

27. An apparatus as defined in claim 18, wherein the re-directed call is a call to a DrawText( )function to display the information identifying the media presentation on the display associated with the computer.

28. An apparatus as defined in claim 18, wherein the computer is at least one of a personal computer, a handheld computing device, a personal digital assistance, a workstation, a cellular telephone, a smart phone, a media player, a television, a digital video recorder, or a digital versatile disc player.

29. A media presentation metering system as defined in claim 17, wherein the re-directed call is a call to a DrawText( )function to display the information identifying the media presentation on the display associated with the computer.

30. A method as defined in claim 1, wherein the character string includes at least a channel name, a channel number or a television program name.

31. A media presentation metering system as defined in claim 17, wherein the monitoring program includes:
  a meter to process the event to determine media presentation information.

32. A media presentation metering system as defined in claim 31, wherein the handler includes:
  a modifier to modify the media presentation program to re-direct the call to the function to the monitoring program; and
  a re-director to direct a re-directed call to the meter.

33. A media presentation metering system as defined in claim 32, wherein the re-director is to direct the re-directed call to the application programming interface independent of the handler determining if the text identified in the re-directed call includes the viewing parameter of interest.

34. A media presentation metering system as defined in claim 31, wherein the handler is to modify an address of the media presentation program.

35. A media presentation metering system as defined in claim 17, wherein the monitoring program is to provide the recorded parameters to the server.

* * * * *